(12) United States Patent
Tsurimoto et al.

(10) Patent No.: US 8,189,323 B2
(45) Date of Patent: May 29, 2012

(54) GAS-INSULATED SWITCHGEAR APPARATUS

(75) Inventors: Takao Tsurimoto, Chiyoda-ku (JP);
Takashi Miyamoto, Chiyoda-ku (JP);
Manabu Yoshimura, Chiyoda-ku (JP);
Osamu Kisanuki, Chiyoda-ku (JP);
Yoshinori Shimizu, Chiyoda-ku (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 255 days.

(21) Appl. No.: 12/628,551

(22) Filed: Dec. 1, 2009

(65) Prior Publication Data
US 2010/0134957 A1 Jun. 3, 2010

(30) Foreign Application Priority Data

Dec. 2, 2008 (JP) ................................. 2008-307155
Nov. 2, 2009 (JP) ................................. 2009-252490

(51) Int. Cl.
*H02B 13/02* (2006.01)
*H02B 1/20* (2006.01)
*B01D 53/02* (2006.01)

(52) U.S. Cl. ........ 361/612; 361/603; 361/618; 361/637; 218/68; 218/155

(58) Field of Classification Search .......... 361/600–621, 361/624–634, 673, 807–810, 829, 830, 832; 174/14 R, 21 C, 22 C, 28, 29, 16.2, 50–53, 174/68, 79, 99 B, 520; 218/1–14, 43–47, 218/67–71, 118–120, 134–138, 143, 152–158; 134/1, 4, 22.19; 336/65, 92, 90, 173, 174, 336/198, 84 R See application file for complete search history.

(56) References Cited

U.S. PATENT DOCUMENTS

| | | | | | |
|---|---|---|---|---|---|
| 3,814,879 | A | * | 6/1974 | Cookson et al. | 218/1 |
| 3,898,367 | A | * | 8/1975 | Nakata | 174/14 R |
| 3,911,937 | A | * | 10/1975 | Sletten et al. | 134/1 |
| 3,921,113 | A | * | 11/1975 | Schiemann | 336/84 R |
| 3,943,433 | A | * | 3/1976 | Hermstein et al. | 323/358 |
| 4,029,891 | A | * | 6/1977 | Nakata | 174/14 R |
| 4,034,147 | A | * | 7/1977 | Clark et al. | 174/14 R |
| 4,064,353 | A | * | 12/1977 | Bolin | 174/14 R |

(Continued)

FOREIGN PATENT DOCUMENTS

JP 57022311 A * 7/1980

(Continued)

*Primary Examiner* — Michail V Datskovskiy
(74) *Attorney, Agent, or Firm* — Buchanan Ingersoll & Rooney PC

(57) ABSTRACT

A gas-insulated switchgear apparatus includes a center conductor 2, a current transformer 4 surrounding the center conductor 2, an electric field shield 5, and a metallic vessel 1. The electric field shield 5 is located between the center conductor 2 and the current transformer 4 and surrounds the center conductor 2. The current transformer 4 and the electric field shield 5 constitute a tubular part that outputs a signal representing an electric physical quantity. The metallic vessel 1 is filled with an insulating gas 19. The tubular part has an opening 6 formed therein. In a posture in which the center axis of the tubular part about which the tubular part surrounds the center conductor 2 is substantially horizontal, the opening 6 is located in a surface of the tubular part, which surface is included in a lower portion of the tubular part and faces the center conductor 2.

20 Claims, 17 Drawing Sheets

U.S. PATENT DOCUMENTS

| | | | | |
|---|---|---|---|---|
| 4,084,064 | A | * | 4/1978 | Bowman .................... 174/14 R |
| 4,085,807 | A | * | 4/1978 | Bolin ........................ 174/14 R |
| 4,088,826 | A | * | 5/1978 | Bolin ........................ 174/14 R |
| 4,330,682 | A | * | 5/1982 | Dale et al. ................. 174/14 R |
| 4,400,578 | A | * | 8/1983 | Cookson et al. ........... 174/14 R |
| 4,554,399 | A | * | 11/1985 | Cookson ................... 174/14 R |
| 4,556,755 | A | * | 12/1985 | Bolin et al. ................ 174/21 C |
| 4,564,721 | A | * | 1/1986 | Ishikawa et al. ............ 174/10 |
| 4,730,085 | A | * | 3/1988 | Hama et al. ................ 174/14 R |
| 5,798,484 | A | * | 8/1998 | Yamagiwa et al. ......... 174/14 R |
| 6,307,172 | B1 | * | 10/2001 | Bolin et al. ................. 218/155 |
| 6,700,471 | B2 | * | 3/2004 | Kakuda et al. .............. 336/174 |
| 7,262,362 | B2 | * | 8/2007 | Holaus et al. ............... 174/14 R |
| 7,414,847 | B2 | * | 8/2008 | Xia et al. .................... 361/704 |
| 7,746,082 | B2 | * | 6/2010 | Maruyama et al. .......... 324/544 |
| 7,790,687 | B2 | * | 9/2010 | Iczkiewicz et al. .......... 514/18.1 |
| 7,858,877 | B2 | * | 12/2010 | Nowakowski et al. ...... 174/14 R |

FOREIGN PATENT DOCUMENTS

| | | | |
|---|---|---|---|
| JP | 61-084616 U | | 6/1986 |
| JP | 02000175315 A | * | 6/2000 |
| JP | 2004-056927 A | | 2/2004 |
| JP | 2004056927 A | * | 2/2004 |

* cited by examiner

US 8,189,323 B2

GAS-INSULATED SWITCHGEAR APPARATUS

BACKGROUND OF THE INVENTION

1. Field of the Invention

The present invention relates to a gas-insulated switchgear apparatus, more particularly relates to a gas-insulated switchgear apparatus including a cylindrical part that is mounted about a center conductor in a manner to surround it.

2. Description of the Related Art

Gas-insulated switchgears are used in the field of electrical power generation and transformation in electrical power systems. Gas-insulated switchgears are constituted by a pressure vessel that is filled with arc-extinguishing gas, and in which a switchgear, a bus bar, and a current transformer or a potential transformer are housed.

Conventionally, efforts have been made to downsize gas-insulated switchgears. One method of downsizing is to set the design value of an electric field at the vicinity of portions to be gas-insulated at a high level so as to shorten the insulation distance and thereby make the device size smaller. However, setting a high design value of the electric field at the vicinity of the portions to be insulated would cause any foreign matter (extraneous matter) in the device, which is otherwise harmless, to turn into a factor that might reduce the insulation reliability.

Unexamined Japanese Patent Application Publication No. 2004-56927 discloses a gas-insulated switchgear that has a capability of rendering a foreign matter harmless. The content of this publication is incorporated herein by reference.

The gas-insulated switchgear disclosed in this publication includes a metal adaptor that mounts a current transformer in the pressure vessel and that has an opening therein. A metallic foreign matter (metallic object) between the current transformer and the center conductor falls downward through the opening formed in the metal adaptor or from an end portion of the current transformer on the opposite side into a low electric field region and thereby is rendered harmless. This construction requires the metallic foreign matter to travel in the axial direction of the current transformer toward either end portion thereof before falling into the low electric field region, taking a long time to get rendered harmless. There is possibility that the metallic foreign matter existing between the current transformer and the center conductor reduces dielectric strength of the gas-insulated switchgear, resulting in low insulation reliability of the gas-insulated switchgear.

SUMMARY OF THE INVENTION

An object of the present invention is to provide a gas-insulated switchgear apparatus that is capable of dislocating a foreign matter having entered between a center conductor and a tubular part surrounding the center conductor to a low electric field region in a relatively short time.

Another object of the present invention is to provide a gas-insulated switchgear apparatus having high insulation reliability.

A gas-insulated switchgear apparatus according to the present invention comprises:
a center conductor through which an electric current flows;
a tubular part that is disposed to surround the center conductor;
a supporting member which is provided on at least one end portion of the tubular part and supports the tubular part; and
a vessel in which the center conductor, the tubular part and the supporting member are housed, and that is filled with an insulating gas,
wherein the tubular part has at least one opening formed in a surface, which faces the center conductor, of the tubular part.

BRIEF DESCRIPTION OF THE DRAWINGS

These objects and other objects and advantages of the present invention will become more apparent upon reading of the following detailed description and the accompanying drawings in which.

DETAILED DESCRIPTION OF THE PREFERRED EMBODIMENTS

Embodiment 1

Figure 1:
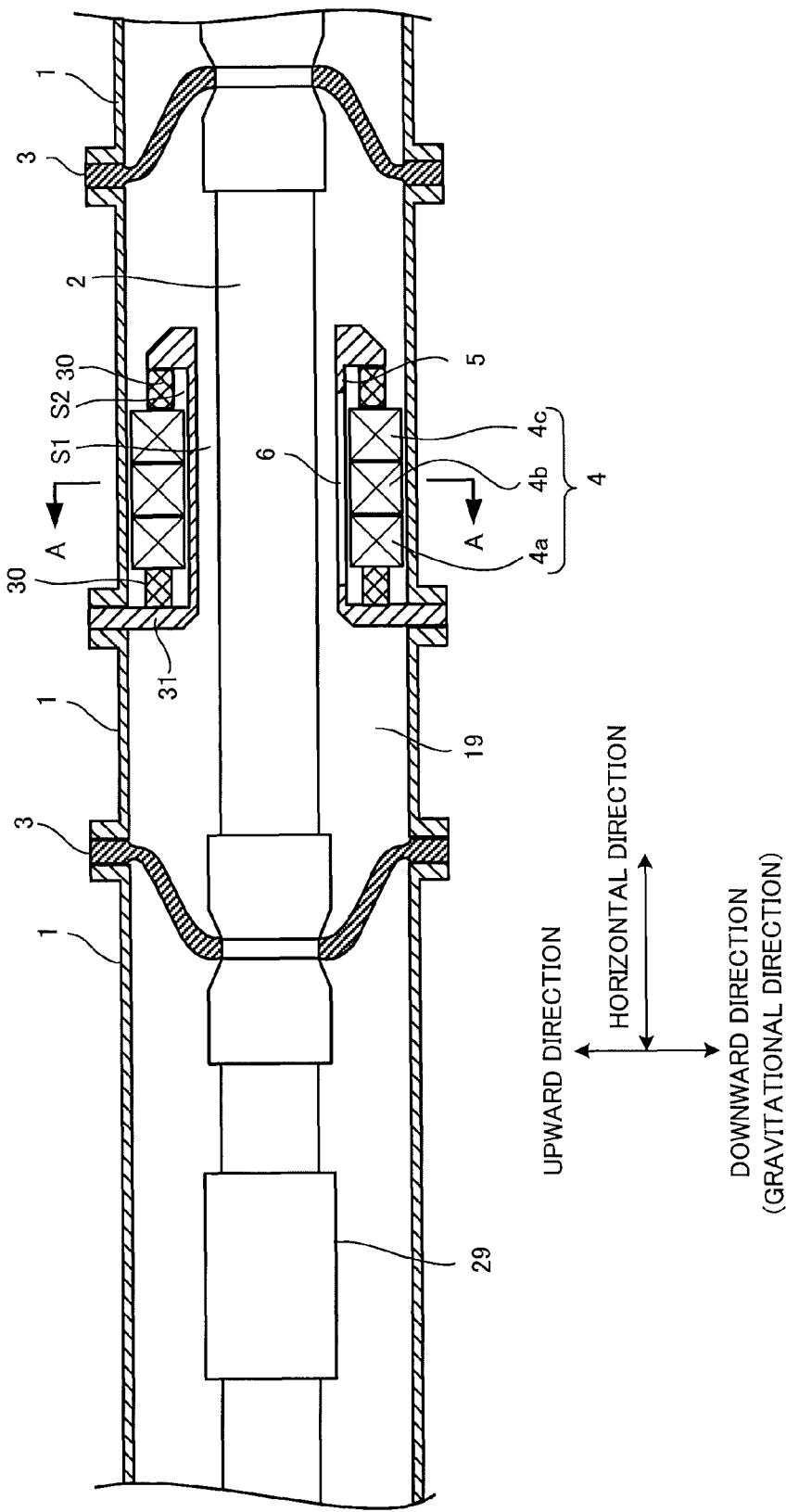
FIG. 1 shows a lengthwise cross section of a gas-insulated switchgear apparatus which has a foreign matter removing structure, according to Embodiment 1 of the present invention.
Figure 2:
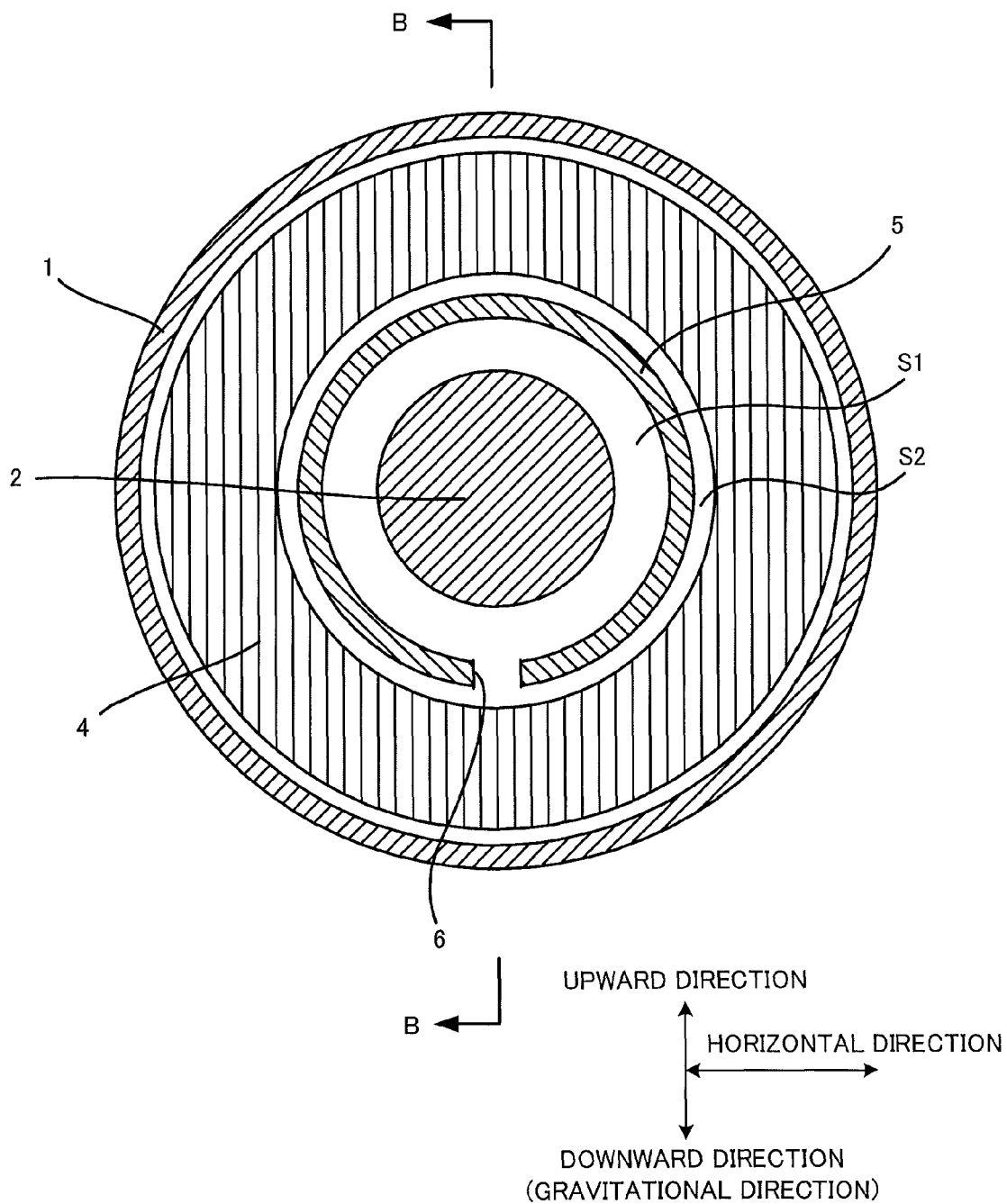
FIG. 2 shows an axial transverse cross section taken along a line A-A in FIG. 1.

A gas-insulated switchgear apparatus 101 according to Embodiment 1 of the present invention will now be explained with reference to the drawings. FIG. 1 is a lengthwise cross sectional view of a gas-insulated switchgear apparatus 101 according to Embodiment 1. FIG. 2 is an axial transverse cross section taken along a line A-A in FIG. 1. FIG. 1 corresponds to a cross sectional view taken along line B-B in FIG. 2. In the Figures, a symbol UD denotes a upper (upward) direction, a symbol DD denotes a downward direction and a symbol HD denotes a horizontal direction.

As shown in FIGS. 1 and 2, the gas-insulated switchgear apparatus 101 comprises: a metallic vessel 1, a center conductor 2, insulating spaces 3, a current transformer 4, an electric field shield 5, and a switchgear 29.

The metallic vessel 1 is formed of a metal layer that encloses the members above and set at a ground potential. The metallic vessel 1 is internally filled with an insulating gas 19 (e.g., $SF_6$ gas).

The center conductor 2 is a main circuit conductor of this gas-insulated switchgear apparatus 101 and fixed to the metallic vessel 1 by the insulating spacers 3. The center conductor 2 is connected to the switchgear 29. In a state that the switchgear 29 is closed, an electric current flows through the center conductor 2.

The current transformer 4 is fixed to the metallic vessel 1 by fixing members 30 and a supporting (base) member 31. The current transformer 4 surrounds the center conductor 2 and generates an electric current that is induced by an alternating magnetic field caused by an alternating current flowing through the center conductor 2.

The current transformer 4 comprises ring-shaped cores 4a, 4b, and 4c. The ring-shaped cores 4a, 4b, and 4c are disposed to each surround the center conductor 2 and to adjoin each other in the axial direction of the center conductor 2.

An electric field shield 5 comprising a tubular conductive metal member is disposed between the center conductor 2 and the cores 4a, 4b, and 4c to surround the center conductor 2. The electric field shield 5 is provided for relaxing concentration of an electric field that might occur at corners of the current transformer 4 or due to unevenness of the surface of the current transformer 4. The electric field shield 5 is set at the ground potential. The electric field shield 5 is formed with the supporting member 31 integrally and is fixed to the metallic vessel 1 via the supporting member 31.

The electric field shield 5 defines two spaces S1 and S2. The space S1 is a space between the center conductor 2 and the electric field shield 5. The space S2 is a space between the electric field shield 5 and the metallic vessel 1. A large (high) electric field is generated in the space S1 when a current flows through the center conductor 2. On the other hand, a very small (low) electric field is generated in the space S2 even when a current flows through the center conductor 2. This is because the metallic vessel 1 and the electric field shield 5 are both set at the ground potential.

The current transformer 4 and the electric field shield 5 constitute a tubular part (tubular sensor) that surrounds the center conductor 2 to output a signal representing an electrical physical quantity. In Embodiment 1, the output signal of the tubular part is an inductive current (or an electromotive force by electromagnetic induction). The center axis of this tubular part (the center axis of the current transformer 4 and the center axis of the electric field shield 5) substantially coincides with the center axis of the center conductor 2.

The switchgear 29 opens and closes the circuit of the center conductor 2.

The gas-insulated switchgear apparatus 101 is installed in a manner that the center axes of the center conductor 2 and its surrounding current transformer 4 are horizontal.

Figure 3:
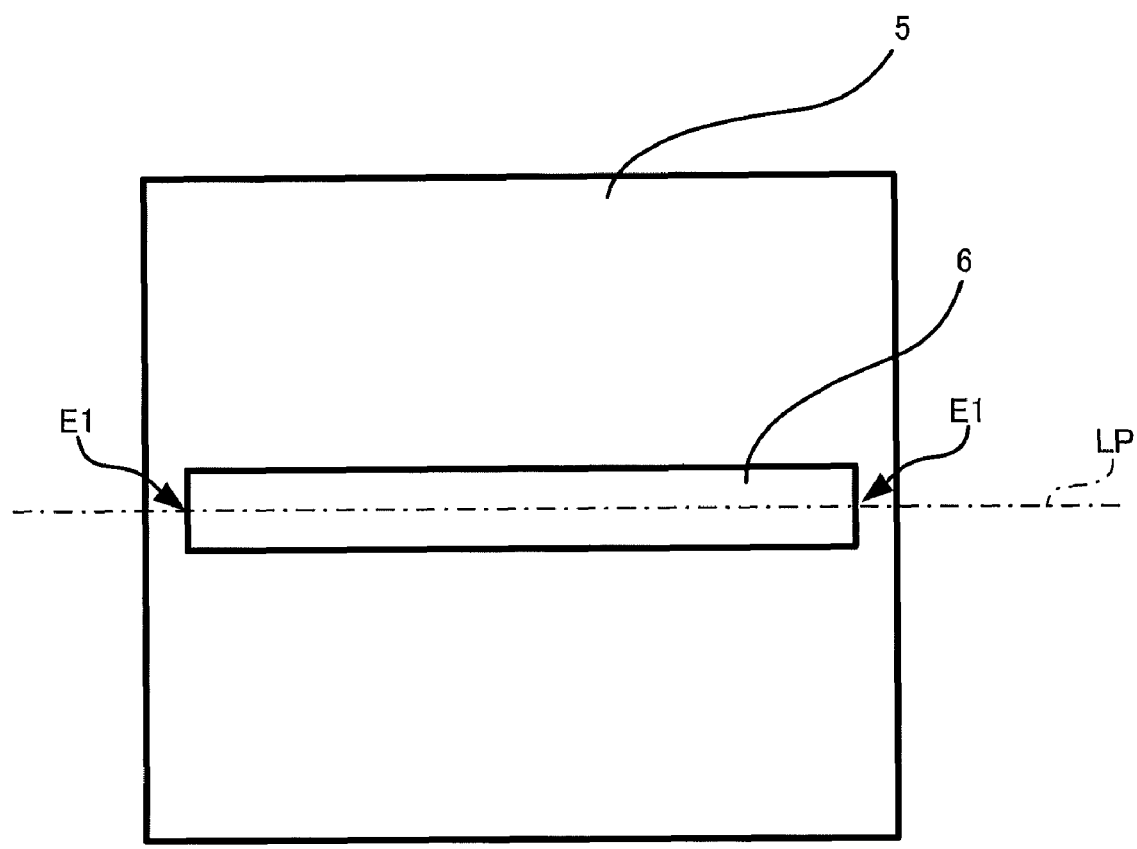
FIG. 3 shows an example of shape and position of an opening formed in an electric field shield.

As shown in FIG. 3, a slit opening 6 is formed in the electric field shield 5. The slit opening 6 is formed over a portion including a lowest portion LP and along the lowest portion LP from one end portion E1 of the electric field shield 5 to another end portion E2 of the electric field shield 5 in the axial direction thereof, in installed state. A foreign matter (foreign object) such as a metallic dust in the space S1 between the center conductor 2 and the electric field shield 5 where the electric field is large falls through the opening 6 downward into the space S2 that is under a low electric field.

A distance between the center conductor 2 and the electric field shield 5 is relatively small. Therefore, the space S1 between the center conductor 2 and the electric field shield 5 is under a higher electric field while a current flows through the center conductor 2. Under such a high electric field, a foreign matter might be affected by an electrostatic force caused by the effect of the electric field to be lifted and reach the center conductor 2 at a higher level of the electric field than the outer face of the electric shield 5, and constitute a factor that reduces the dielectric strength. Even if a foreign matter does not reach the center conductor 2, it might constitute a factor that causes a local concentration of an electric field, which, after all, will constitute a factor that reduces the dielectric strength when there occurs an overvoltage such as an isolation surge voltage caused by actuation of an unillustrated isolator or a lightning impulse voltage caused by a lightning strike. The foreign matter is, for example, a metallic dust. The foreign matter is produced, for example, while this gas-insulated switchgear apparatus 101 is assembled or put under operation and enters inward of the electric field shield 5.

Figure 4:
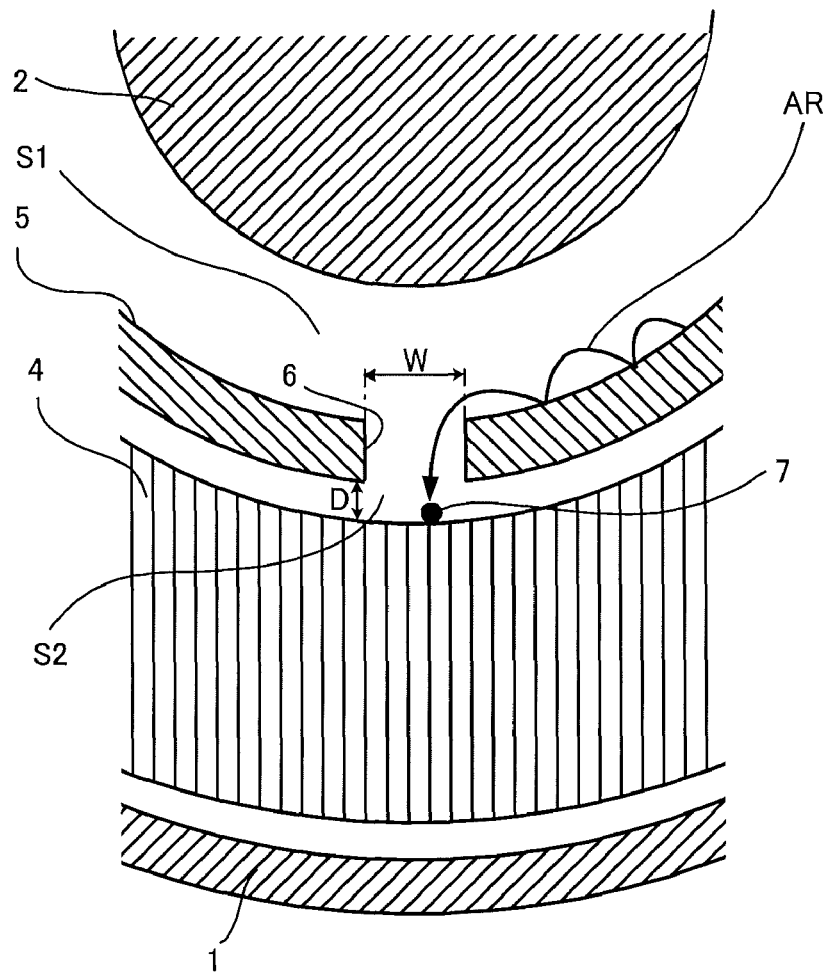
FIG. 4 is an enlarged cross sectional view of a part of FIG. 2.
Figure 4:
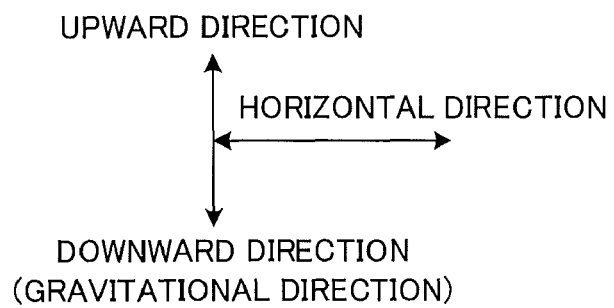

FIG. 4 is an enlarged cross section of a part of FIG. 2. With reference to FIG. 4, behaviors of a foreign matter that has entered the space S1 between the center conductor 2 and the electric field shield 5 will be explained. A foreign matter 7 in the space S1 repetitively goes up and down as shown in arrow AR by the effects of a levitation force originating from electrostatic induction or electric polarization caused by an applied electric field and a gravitational force. The foreign matter 7 eventually reaches the opening 6 and falls downward therethrough by the gravity into a recess formed by the opening 6 and the inner surface of the current transformer 4. The recess is a part of the space S2 which is the outer portion of the electric field shield 5 and in which the electric field is weak. Therefore, the foreign matter 7 does not go up and down any more and stays in the bottom (on the inner surface of the current transformer 4) of the recess or under the opening 6. Namely the foreign matter 7 is trapped at the bottom of the recess, and rendered harmless. The strength of the electric field at the bottom of the recess is depending on a width W of the opening 6 in circumferential direction thereof and a distance D between an inner surface of the electric field shield 5 and an inner surface of the current transformer 4 as shown in FIG. 4. By setting a relationship of width W<distance D, i.e., by making the width W of the opening 6 in circumferential direction thereof being smaller than the distance D between the inner surface of the electric field shield 5 facing the center conductor 2 and the inner surface of the current transformer 4 facing the center conductor 2, the electric field can be greatly lower at the bottom, imparting this region a greater trapping performance.

Figure 5:
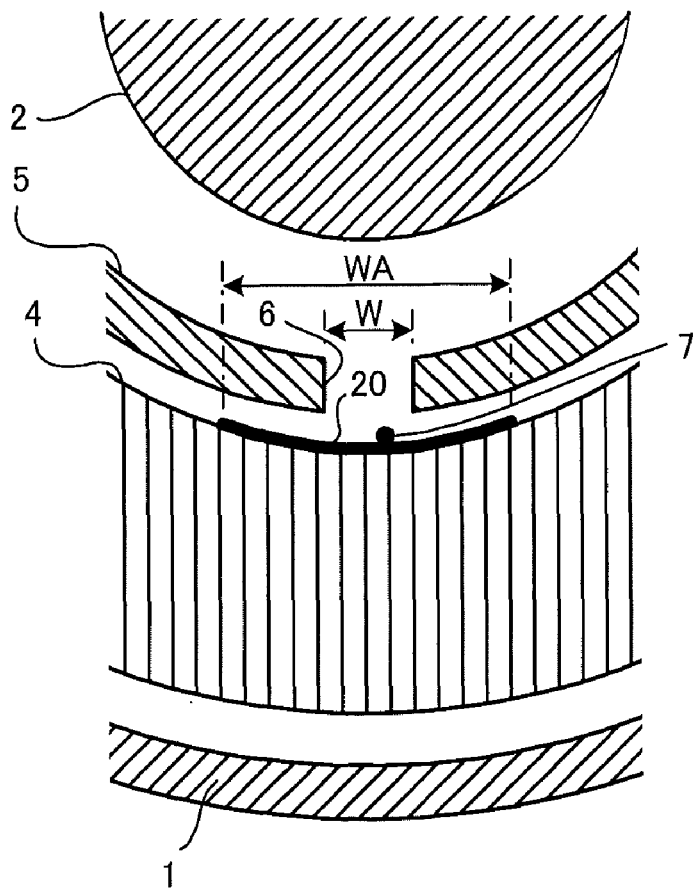
FIG. 5 is an enlarged cross sectional view of another applicable structure for the foreign matter removing structure shown in FIGS. 1 to 4.

As shown in FIG. 5, an adhesive layer 20 may be provided on an inner surface of the current transformer 4 that faces the center conductor 2 through the opening 6. The adhesive layer 20 may be formed by sticking a sheet made of a gelatinous material, sticking a double-face adhesive tape, coating an adhesive coating material, or like manners. The adhesive layer 20 provided on the surface of the cores 4a, 4b, and 4c, which is positioned at the bottom of the recess, enables the foreign matter 7 having fallen there to be more securely trapped. It is desirable the width WA of the adhesive layer 20 in a circumferential direction thereof is greater than the width W of the opening 6 in a circumferential direction thereof so as to trap the foreign matter 7.

As explained above in detail, the gas-insulated switchgear apparatus 101 according to Embodiment 1 removes a foreign matter that has entered between the center conductor 2 and the electric field shield 5, by letting the foreign matter fall into a low electric field region (the recess formed by the opening 6 and the current transformer 4). The gas-insulated switchgear apparatus 101 can realize high insulation reliability, because it can quickly remove the foreign matter without requiring the foreign matter to travel a long distance until it reaches an end portion of the current transformer 4.

According to Embodiment 1, the insulation distance between the center conductor 2 and the electric field shield 5 can be shorter and hence the size of the metallic vessel 1 can be smaller. Accordingly, each part can be made of a smaller amount of material and with a smaller amount of machining. Furthermore, the metallic vessel 1 can have a smaller cubic measure, which leads to reduction of the amount of SF6 gas to be used.

Further, the Mean Time Between Failures (MTBF) of the gas-insulated switchgear apparatus 101 can be longer and the availability factor of the apparatus can be improved. This reduces the frequency of checking the apparatus by opening it to see the interior and the frequency of collecting and refilling arc-extinguishing gas such as $SF_6$ gas, reducing the amount of the gas to be used.

As described above, Embodiment 1 can reduce environmental impacts at each stage of the life cycle of the gas-insulated switchgear.

Embodiment 1 has been an example wherein the tubular part that surrounds the center conductor 2 is the current transformer 4. Not only the current transformer 4 but any other tubular parts which surround the center conductor 2 to generate a signal representing an electric physical quantity will produce the same effect if the idea of Embodiment 1 is applied thereto. For example, the tubular part may include another sensor that surrounds the center conductor 2, such as a voltage transformer and a voltage-current transformer. Further, the sensor is not limited to a transformer such as a current transformer or a voltage transformer, but may be another sensor such as a pressure sensor, a temperature sensor and so on. The voltage transformer outputs a voltage that originates from electromagnetic induction caused by a magnetic field applied thereto. The current transformer flows therethrough a current that originates from electromagnetic induction caused by a magnetic field applied thereto. The pressure sensor detects pressure and outputs a signal representing the detected pressure, and the temperature sensor detects the temperature and outputs a signal representing the detected temperature. It is possible to achieve the same effect as Embodiment 1 by forming an opening in the lowest portion of the electric field shield 5 even when the tubular part includes this kind of sensor.

Figure 6A:
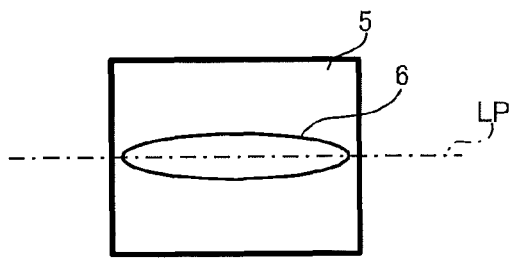
FIGS. 6A to 6F show examples of shapes, positions and numbers of the opening(s) formed in the electric field shield.
Figure 6B:
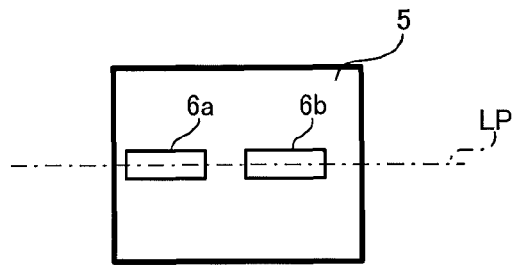
Figure 6C:
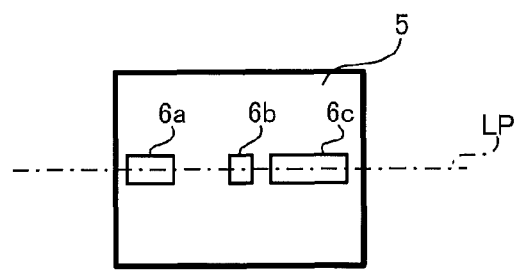
Figure 6D:
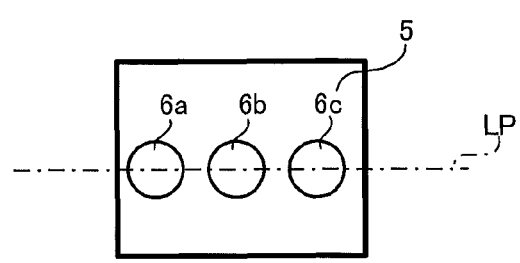
Figure 6E:
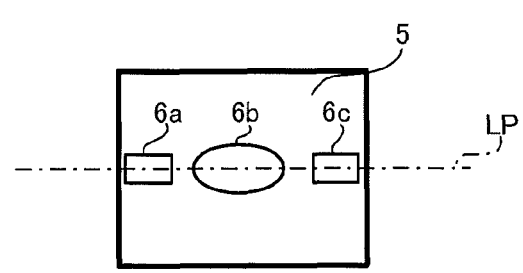
Figure 6F:
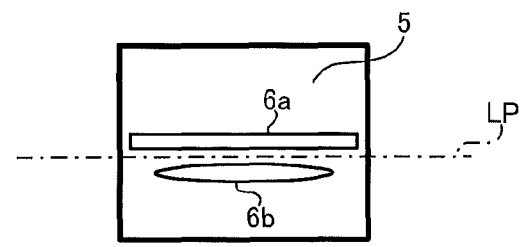

The number, shape and position of the opening(s) 6 formed in the electric field shield 5 are arbitrarily selected. For example, as shown in FIGS. 6A to 6F, the shapes of the opening(s) 6 (6a to 6c) may be a rectangular slit, an elliptical slit and so on. The opening 6 may be circular. A plurality of openings 6 (6a to 6c) may be formed as shown in FIGS. 6B to 6F. It is desirable that the plurality of openings 6 (6a to 6c) are formed serially from one end portion of the electrical shield 5 to the other end of the electrical shield 5 as shown in FIGS. 6B to 6F. The shapes of the plurality of openings 6 (6a to 6c) may be different from each other as shown in FIGS. 6C, 6E, and 6F. The position(s) of the opening(s) is arbitrarily selected. It is desirable that at least one opening 6 is formed over an area including the lowest portion LP of the tubular electric field shield 5 in installed posture as shown in FIGS. 6A to 6E. The opening(s) 6 (6a, 6b) may be formed adjacent to the lowest portion LP as shown in FIG. 6F. It is desirable that the size of each opening 6 is larger than that of predicted foreign matter 7.

Embodiment 2

Figure 7:
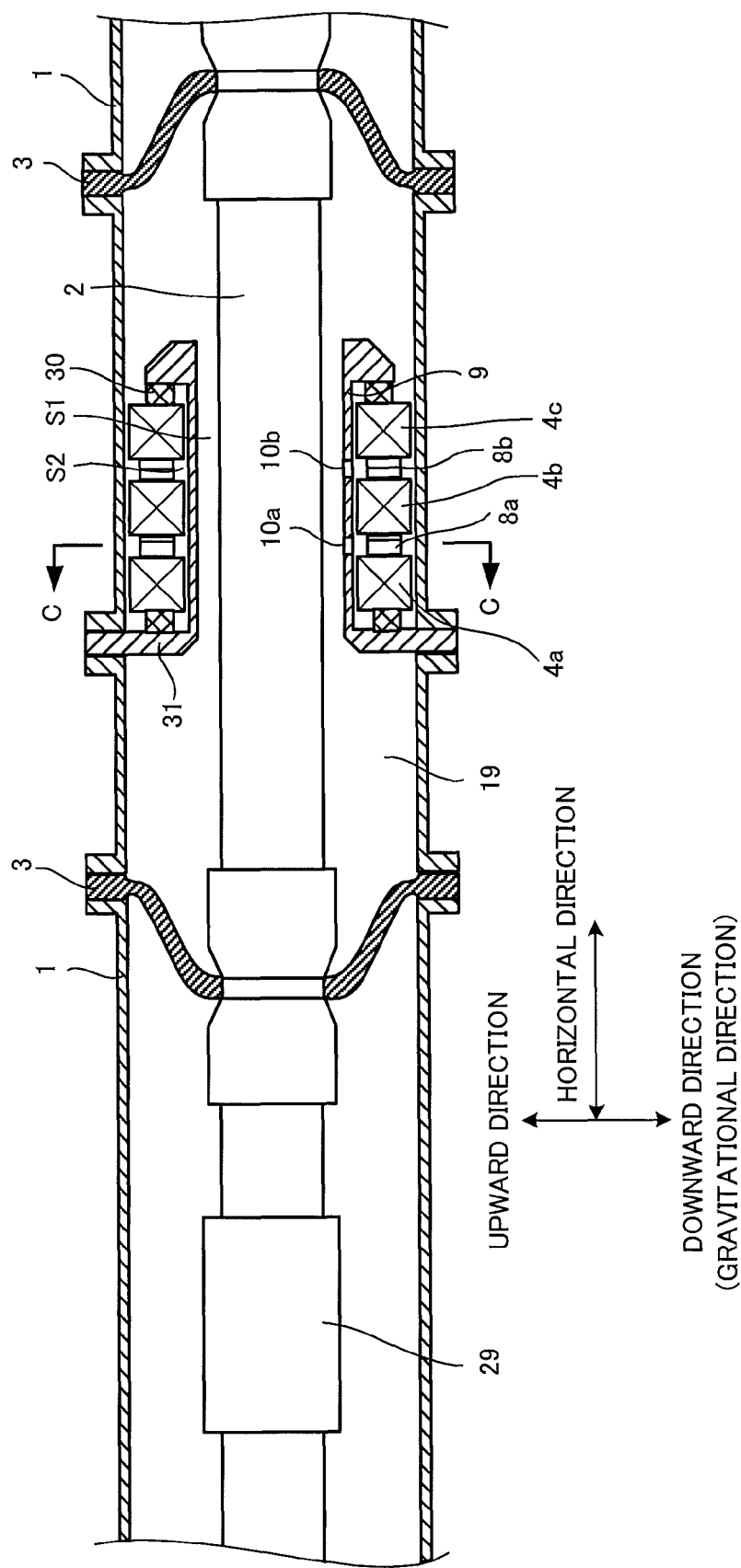
FIG. 7 shows a lengthwise cross section of a gas-insulated switchgear apparatus which has a foreign matter removing structure, according to Embodiment 2 of the present invention.
Figure 8:
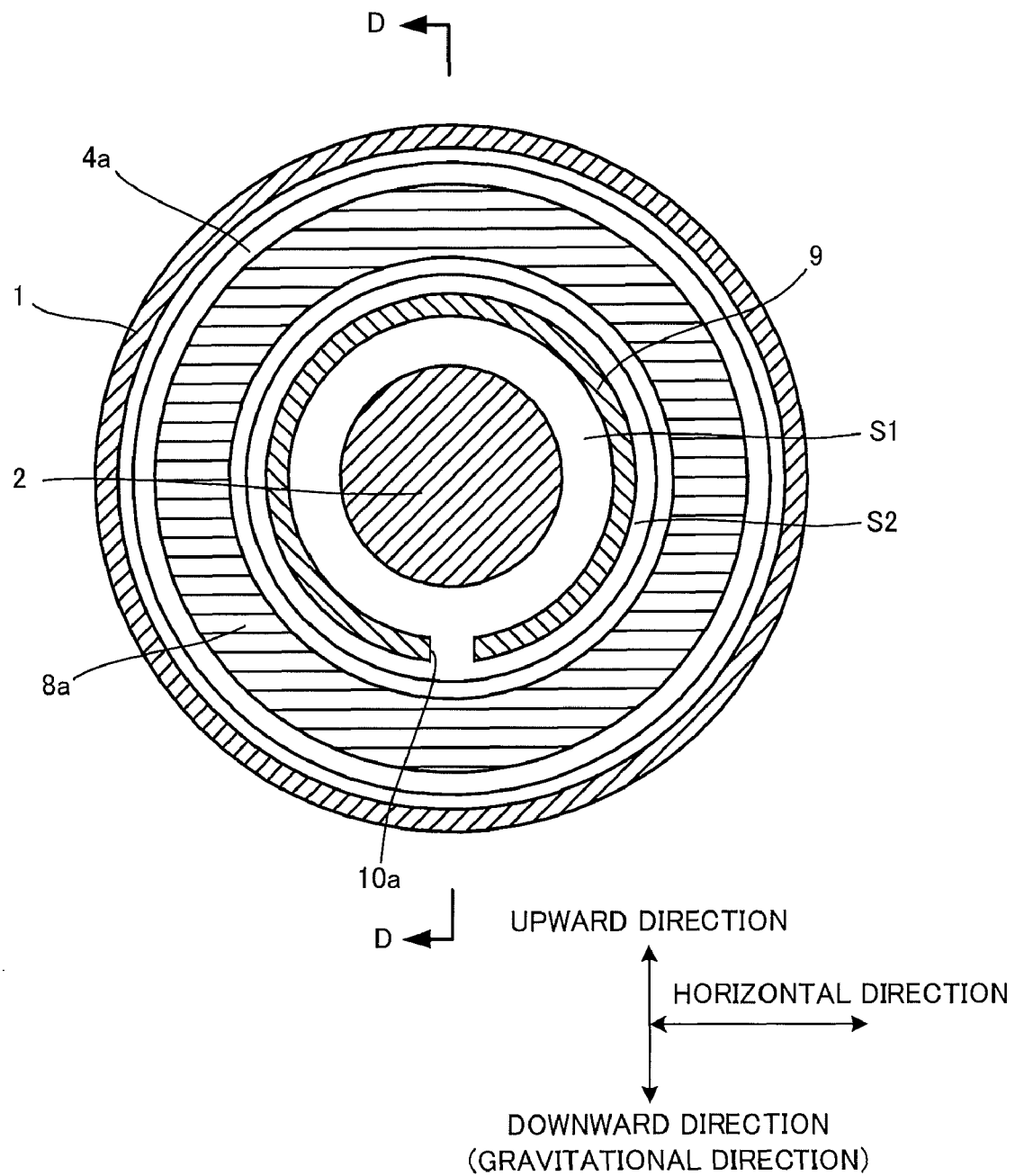
FIG. 8 shows an axial transverse cross section taken along a line C-C in FIG. 7.

FIG. 7 shows a lengthwise cross section of a gas-insulated switchgear apparatus 102 according to Embodiment 2 of the present invention. FIG. 8 shows an axial transverse cross section taken along a line C-C in FIG. 7. FIG. 7 corresponds to the cross sectional view taken along line D-D in FIG. 8.

The gas-insulated switchgear apparatus 102 also has a foreign matter removing structure.

In Embodiment 2, as shown in FIGS. 7 and 8, between cores 4a, 4b, and 4c of a current transformer 4 are provided inter-core spacers 8a and 8b having ring shape. The cores 4a, 4b, and 4c are components that constitute the current transformer 4, which is a part of a tubular part. The inter-core spacers 8a and 8b are spacing members that keep the cores 4a, 4b, and 4c at fixed intervals. The fixed intervals between the cores 4a-4c may be the same with each other or different from each other.

The inner diameters of the inter-core spacers 8a and 8b are larger than the inner diameters of the cores 4a, 4b, and 4c and the center axes of the inter-core spacers 8a and 8b coincide with those of the cores 4a, 4b and 4c, so that recesses are formed by the cores 4a and 4b and the spacer 8a, and by the cores 4b and 4c and the spacer 8b at the lower portion of the current transformer 4. That is, at around the lower portion of the current transformer 4, inner surfaces of the inter-core spacers 8a and 8b that face the center conductor 2 are positioned lower than the inner surfaces of the cores 4a, 4b, and 4c.

An electric field shield 9 having a tubular (cylindrical) shape is disposed between the center conductor 2 and the current transformer 4 to surround the center conductor 2, for the purpose of relaxing concentration of an electric field which might occur at corners of the current transformer 4 or due to unevenness of the surface of the current transformer 4. The current transformer 4 is fixed at the outer side of the electric field shield 9 by a fixing member 30. The electric field shield 9 is fixed to the metallic vessel 1 via the supporting member 31. Two openings 10a and 10b are formed at lower portions of the electric field shield 9 and face the inter-core spacers 8a and 8b, for letting a foreign matter fall to be removed. The electric field shield 9 is set at the ground potential. It is desirable that the length of each of the openings 10a and 10b in the axial direction thereof is smaller than that of the recess (width of each of the inter-core spacers 8a and 8b (length in the axial direction thereof)). In the other respects, the foreign matter removing structure is the same as Embodiment 1. The current transformer 4, the inter-core spacers 8a and 8b, and the electric field shield 9 constitute a tubular part that surrounds the center conductor 2 and outputs a signal representing an electric physical quantity.

Like in Embodiment 1, a foreign matter that has entered the space S1 between the center conductor 2 and the electric field shield 9 repetitively goes up and down by the a levitation force originating the electric field generated therein and a gravitational force. The foreign matter eventually reaches the opening 10a or 10b and falls downward therethrough by the gravitation force into the recesses formed by the openings 10a and 10b in the electric field shield 9, the current transformer 4 and the inter-core spacers 8a and 8b. The electric field in the space S2 which is outside of the electric field shield 9 is weak. Therefore, the electric field in the recesses is weak where the foreign matter is trapped.

Figure 9:
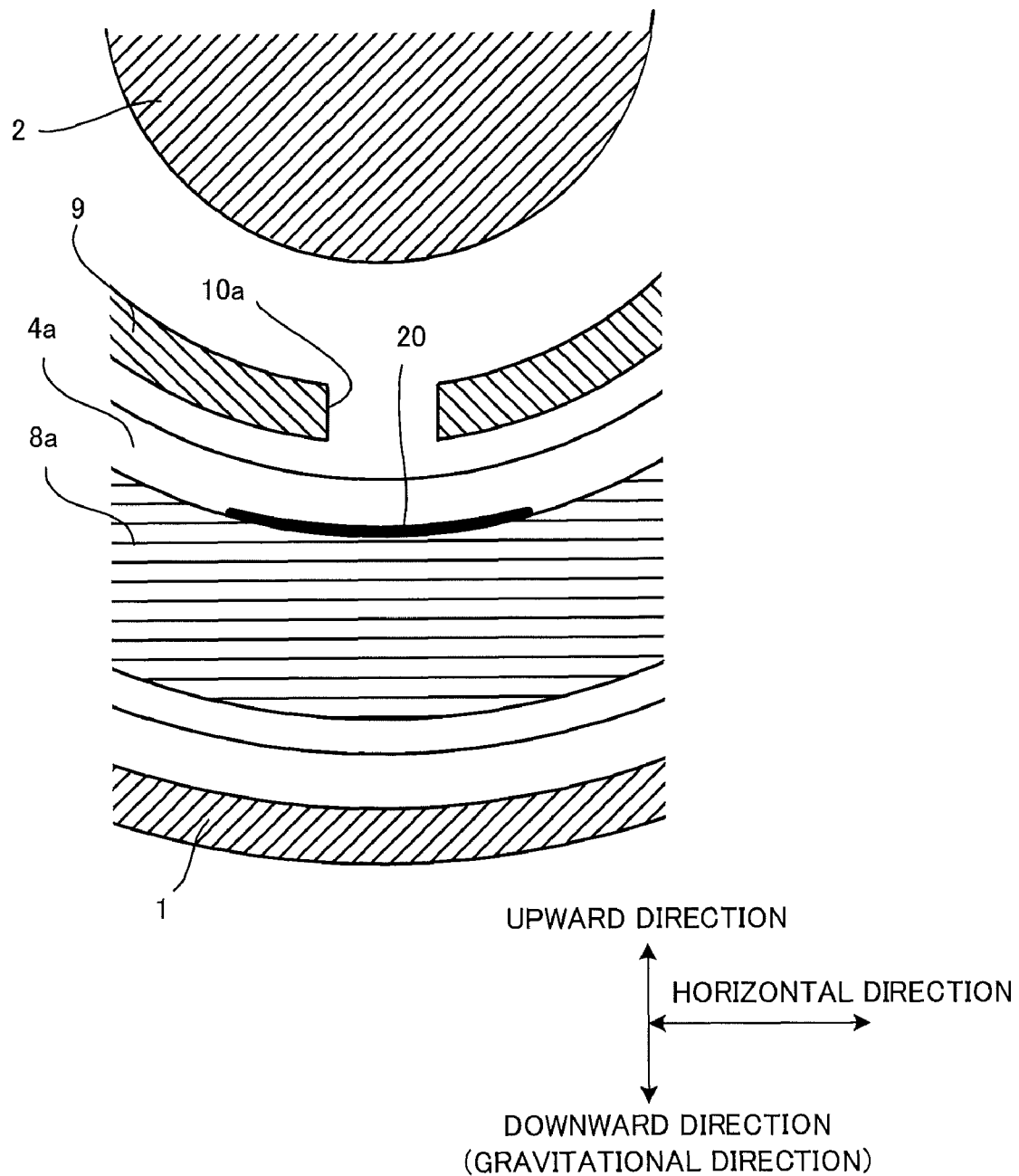
FIG. 9 shows an enlarged cross sectional view of another applicable structure for the foreign matter removing structure shown in FIG. 8.

As shown in FIG. 9, adhesive layers 20 may be provided on the lower portions of inner surfaces of the inter-core spacers 8a and 8b that face the center conductor 2 through the openings 10a or 10b. The adhesive layers 20 provided on the inner surfaces of the inter-core spacers 8a and 8b, which are positioned at the bottom of the recesses, enable the foreign matter having fallen there to be more securely trapped. The adhesive layer 20 may be provided for each of openings 10a and 10b or one adhesive layer 20 facing both of the openings 10a and 10b may be provided. The adhesive layer 20 may be formed by sticking a sheet made of a gelatinous material, sticking a double-face adhesive tape, coating an adhesive coating material, or like manners.

Figure 10:
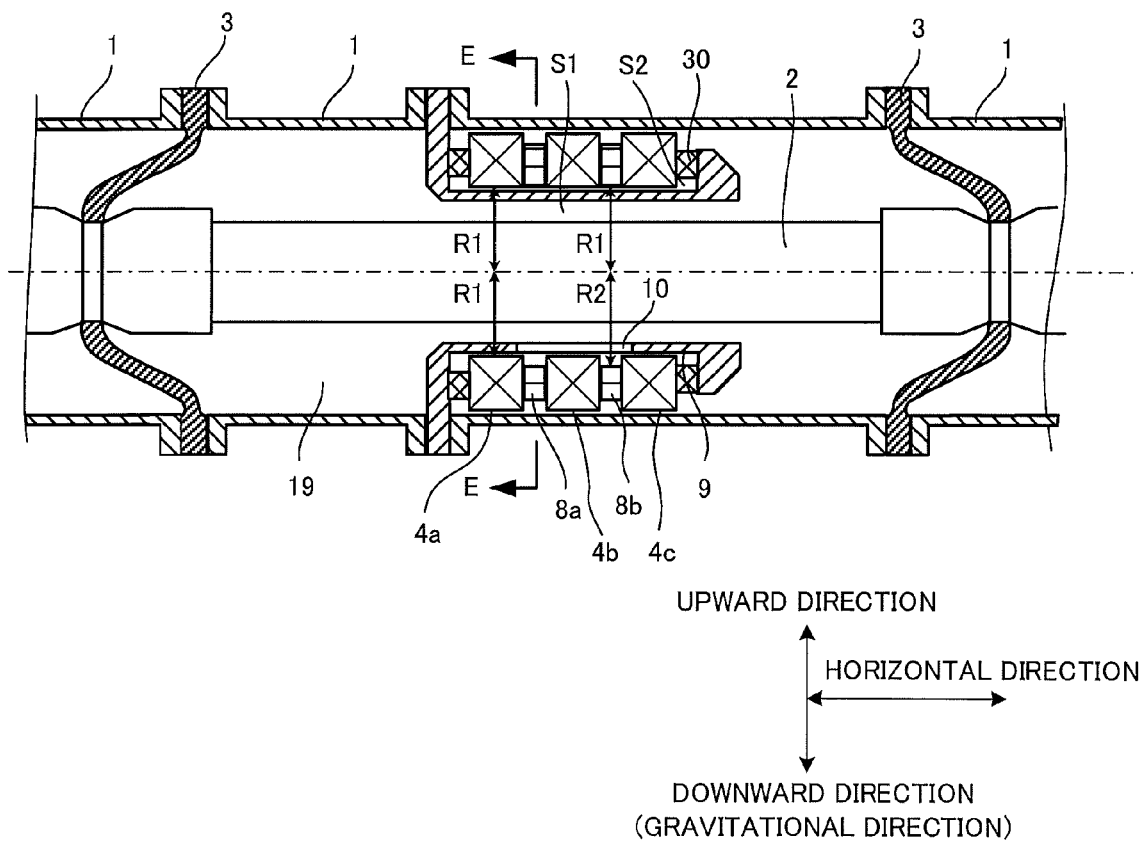
FIG. 10 is a lengthwise cross section of a modified gas-insulated switchgear apparatus according to Embodiment 2.
Figure 11:
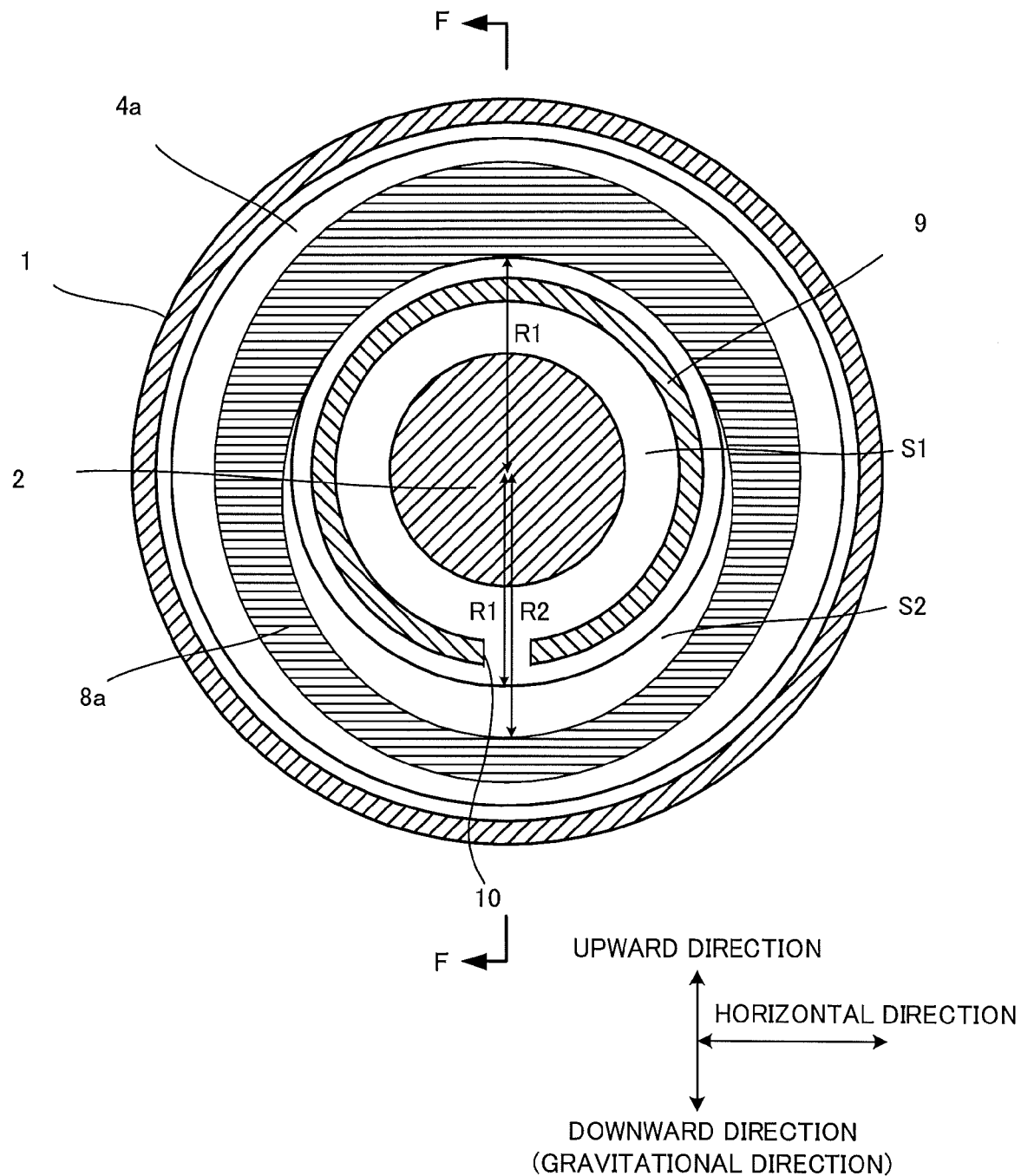
FIG. 11 shows an axial transverse cross section taken along a line E-E of FIG. 10.

In Embodiment 2, the ring-shaped inter-core spacers 8a and 8b have an inner radius larger than that of the current transformer 4. The shape of the inter-core spacers 8a and 8b is not limited to this and arbitrarily designed as long as the recesses for trapping the foreign matters are formed under the openings 10a and 10b. For example, as shown in FIGS. 10 and 11, the inter-core spacers 8a and 8b may be formed so that the inner radius R1 of upper portions of the inter-core spacers 8a and 8b is identical to the inner radius R1 of the cores 4a, 4b and 4c, but the radius R2 of lower portions of the inter-core spacers 8a and 8b is greater than R1 so as to form the recess portions. In this instance, a similar foreign matter removal effect can be attained. FIG. 10 shows a lengthwise cross section of the modified gas-insulated switchgear apparatus 102. FIG. 11 shows an axial transverse cross section taken along a line E-E in FIG. 10. FIG. 10 corresponds to the cross sectional view taken along line F-F in FIG. 11. Further, in this example, the openings 10a and 10b are integrally formed into a single opening 10.

As explained above, the gas-insulated switchgear apparatus 102 according to Embodiment 2 removes a foreign matter that has entered between the center conductor 2 and the electric field shield 9, by letting the foreign matter fall to a low electric field region. The gas-insulated switchgear apparatus 102 can realize high insulation reliability, because it can quickly remove the foreign matter without requiring the foreign matter to travel a long distance until it reaches an end portion of the current transformer 4. Further, the inter-core spacers 8a and 8b can make a deeper with the openings 10a and 10b, realizing a high foreign matter trapping performance. Embodiment 2 matches or excels Embodiment 1 in the effect of reducing environmental impacts at each stage of the life cycle of the gas-insulated switchgear apparatus.

This invention is not limited to the structure shown in FIGS. 7 to 11. A same effect can be obtained if the distances between inner surfaces of the inter-core spacers 8a and 8b and the axis of the center conductor 2 is larger than the distances between inner surfaces of the cores 4a to 4c and the axis of the center conductor 2, at least near the openings 10 to 10c.

Embodiment 3

Figure 12:
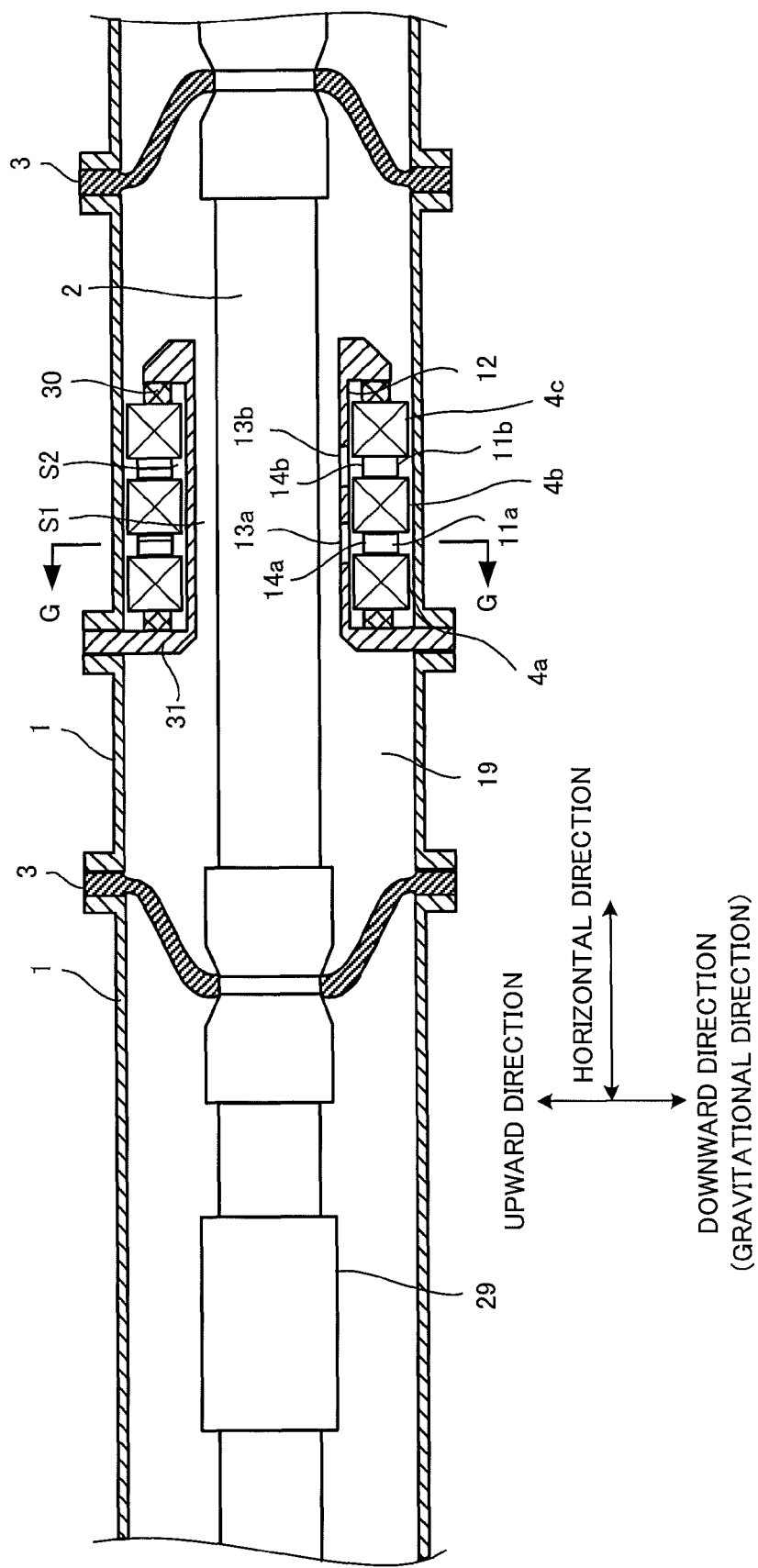
FIG. 12 is a lengthwise cross section of a gas-insulated switchgear apparatus which has a foreign matter removing structure of a current transformer, according to Embodiment 3 of the present invention.
Figure 13:
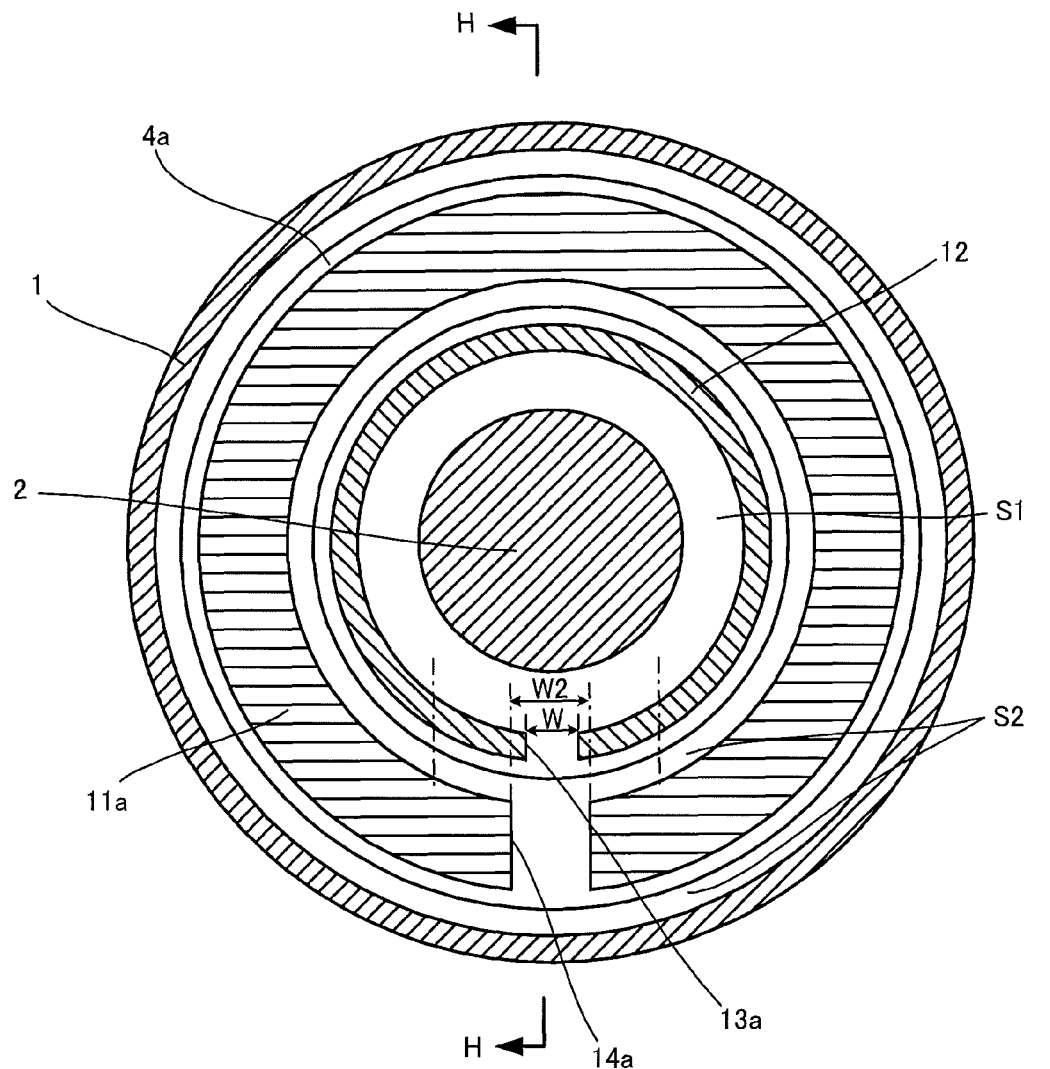
FIG. 13 shows an axial transverse cross section taken along a line G-G of FIG. 12.
Figure 13:
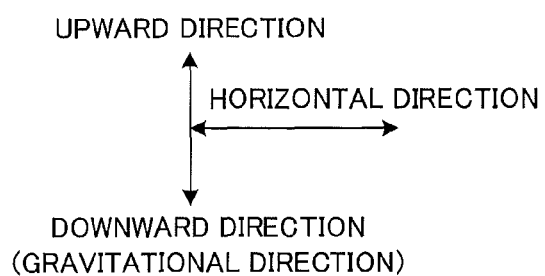

FIG. 12 shows a lengthwise cross section of a gas-insulated switchgear apparatus 103 according to Embodiment 3 of the present invention. FIG. 13 is an axial transverse cross section taken along a line G-G in FIG. 12. FIG. 12 corresponds to a cross sectional view taken along a line H-H line in FIG. 13.

The gas-insulated switchgear apparatus 103 also has a foreign matter removing structure. In Embodiment 3, as shown in FIGS. 12 and 13, between cores 4a, 4b, and 4c of a current transformer 4 are provided inter-core spacers 11a and 11b. The inter-core spacers 11a and 11b have a ring shape and have holes (openings) 14a and 14b formed in their lower portion. The cores 4a, 4b, and 4c are components that constitute the current transformer 4, which is a part of a tubular part. The inter-core spacers 11a and 11b are spacing members that keep the cores 4a, 4b, and 4c at fixed intervals. The fixed intervals between the cores 4a-4c may be the same with each other or different from each other.

An electric field shield 12 having a cylindrical shape is disposed between the cores 4a, 4b, and 4c and the center conductor 2 so as to surround the center conductor 2, for the purpose of relaxing concentration of an electric field which might occur at corners of the current transformer 4 or due to unevenness of the surface of the current transformer 4. The current transformer 4 is fixed at the outer side of the electric field shield 12 by a fixing member 30. The electric field shield 12 is fixed to the metallic vessel 1 via the supporting member 31. The electric field shield 12 has openings 13a and 13b formed at the lowest portion thereof that oppose to the holes 14a and 14b of the inter-core spacers 8a and 8b, respectively, for letting a foreign matter fall to be removed. It is desirable that the size W2 of the holes 14a and 14b in the circumference direction thereof is larger than the size W of the openings 13a and 13b in the circumference direction thereof. The electric field shield 12 is set at the ground potential. In the other respects, the foreign matter removing structure is the same as that in Embodiment 1. The current transformer 4, the inter-core spacers 11a and 11b, and the electric field shield 12 constitute a tubular part that surrounds the center conductor 2 and outputs a signal representing an electric physical quantity.

Like in Embodiment 1, a foreign matter that has entered in the space S1 between the electric field shield 12 and the center conductor 2 repetitively goes up and down by the effects of a levitation force originating an electric field applied there and a gravitational force, and eventually reaches the opening 13a or 13b and falls downward therethrough by the gravity force. The hole 14a or 14b of the inter-core spacer 11a or 11b that is positioned below the opening 13a or 13b allows the foreign matter to fall downward to the bottom of the metallic vessel 1. The bottom of the metallic vessel 1, to where the foreign matter has fallen, is in the space S2 under a low electric field, because both of the electric field shield 12 and the metallic vessel 1 are set at the ground potential. Accordingly, there is no enough electrostatic force to make the foreign matter to go upward from there, leaving the foreign matter trapped in this position to be rendered harmless.

Figure 14:
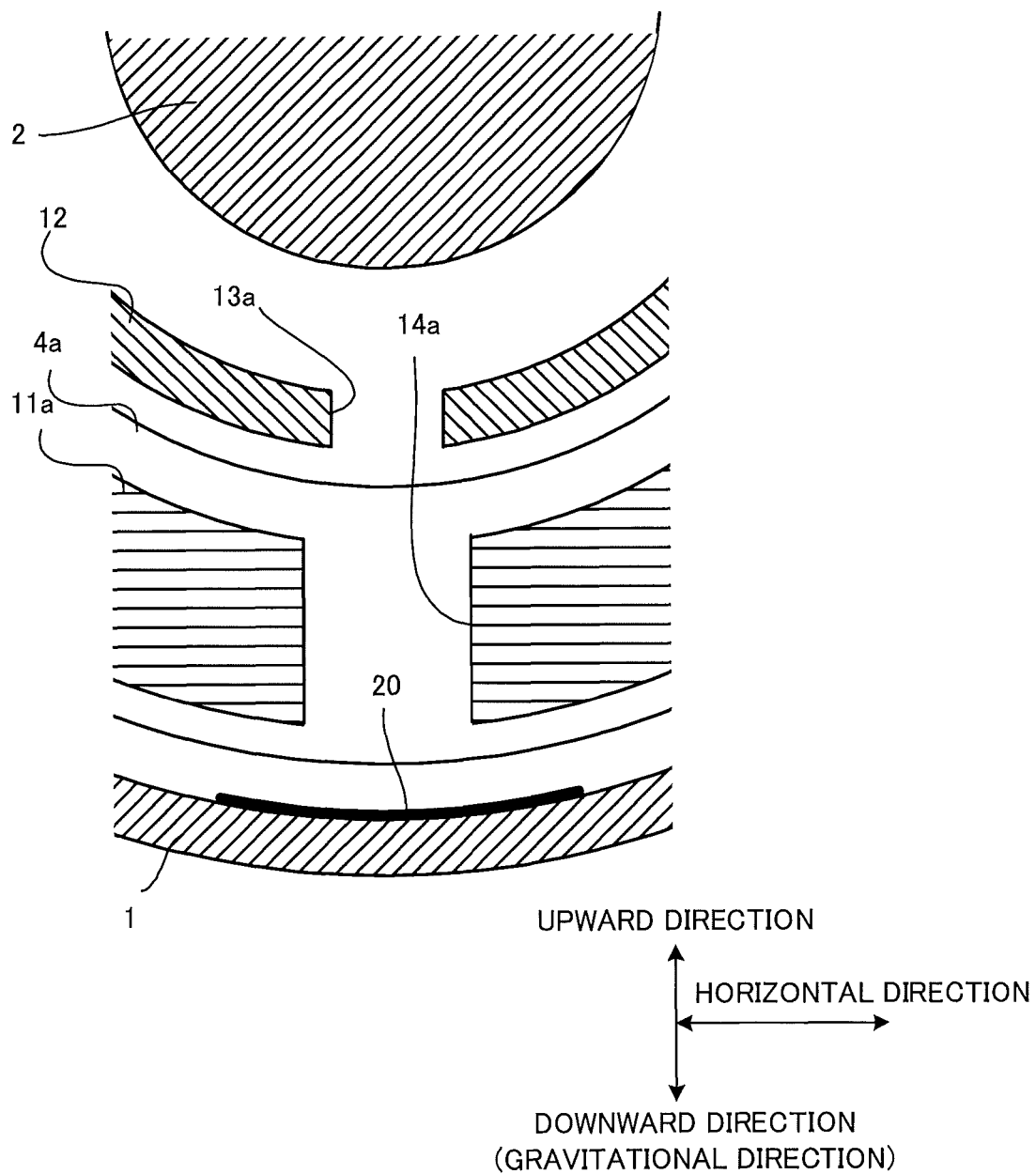
FIG. 14 shows an enlarged cross sectional view of another applicable structure for the foreign matter removing structure shown in FIG. 13.

As shown in FIG. 14, an adhesive layer 20 may be provided on portions of the metallic vessel 1 that faces the center conductor 2 through the opening 13a or 13b. The adhesive layer 20 provided on the surface of the metallic vessel 1, which is positioned at the bottom of the recess shape, enables the foreign matter having fallen there to be more securely trapped. Further, the openings 13a and 13b may be linked integrally formed into a single opening. The adhesive layer 20 may be formed by sticking a sheet made of a gelatinous material, sticking a double-face adhesive tape, coating an adhesive coating material, or like manners.

As described above, Embodiment 3 removes a foreign matter that has entered between the center conductor 2 and the electric field shield 12 by letting the foreign matter fall from the opening 13a or 13b into a low electric field region inside the metallic vessel 1. The gas-insulated switchgear apparatus 103 can realize high insulation reliability, because it can quickly remove the foreign matter without requiring the foreign matter to travel a long distance until it reaches an end portion of the current transformer 4. Further, the holes 14a and 14b formed in the inter-core spacers 11a and 11b can make a recess shape with the openings 13a and 13b deeper as the bottom of the recess shape corresponds to the inner surface of the metallic vessel 1, realizing a high foreign matter trapping performance. Embodiment 3 matches or excels Embodiment 1 in the effect of reducing environmental impacts at each stage of the life cycle of the gas-insulated switchgear.

Embodiment 4

Figure 15:
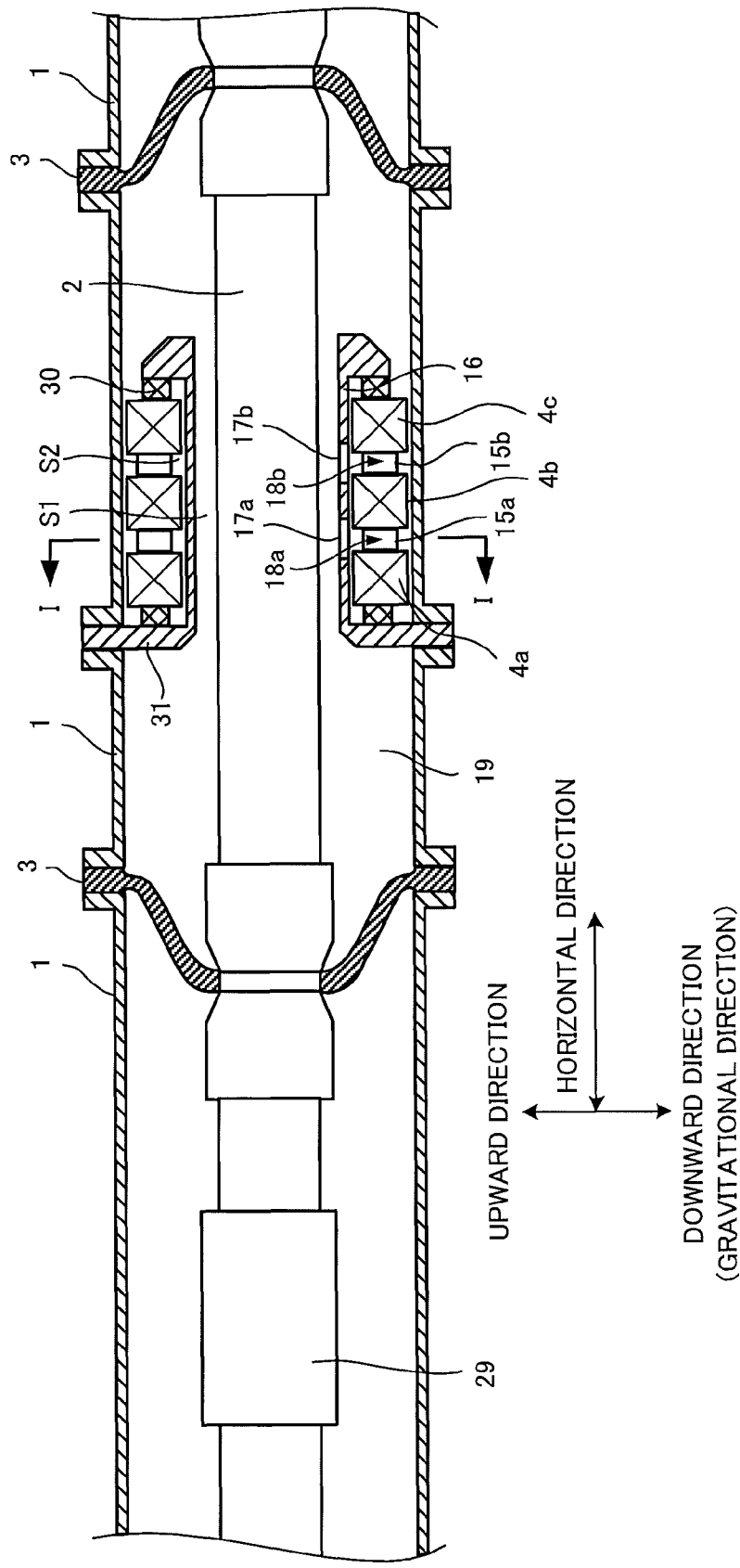
FIG. 15 shows a lengthwise cross sectional view of a gas-insulated switchgear apparatus which has a foreign matter removing structure of a current transformer, according to Embodiment 4 of the present invention.
Figure 16:
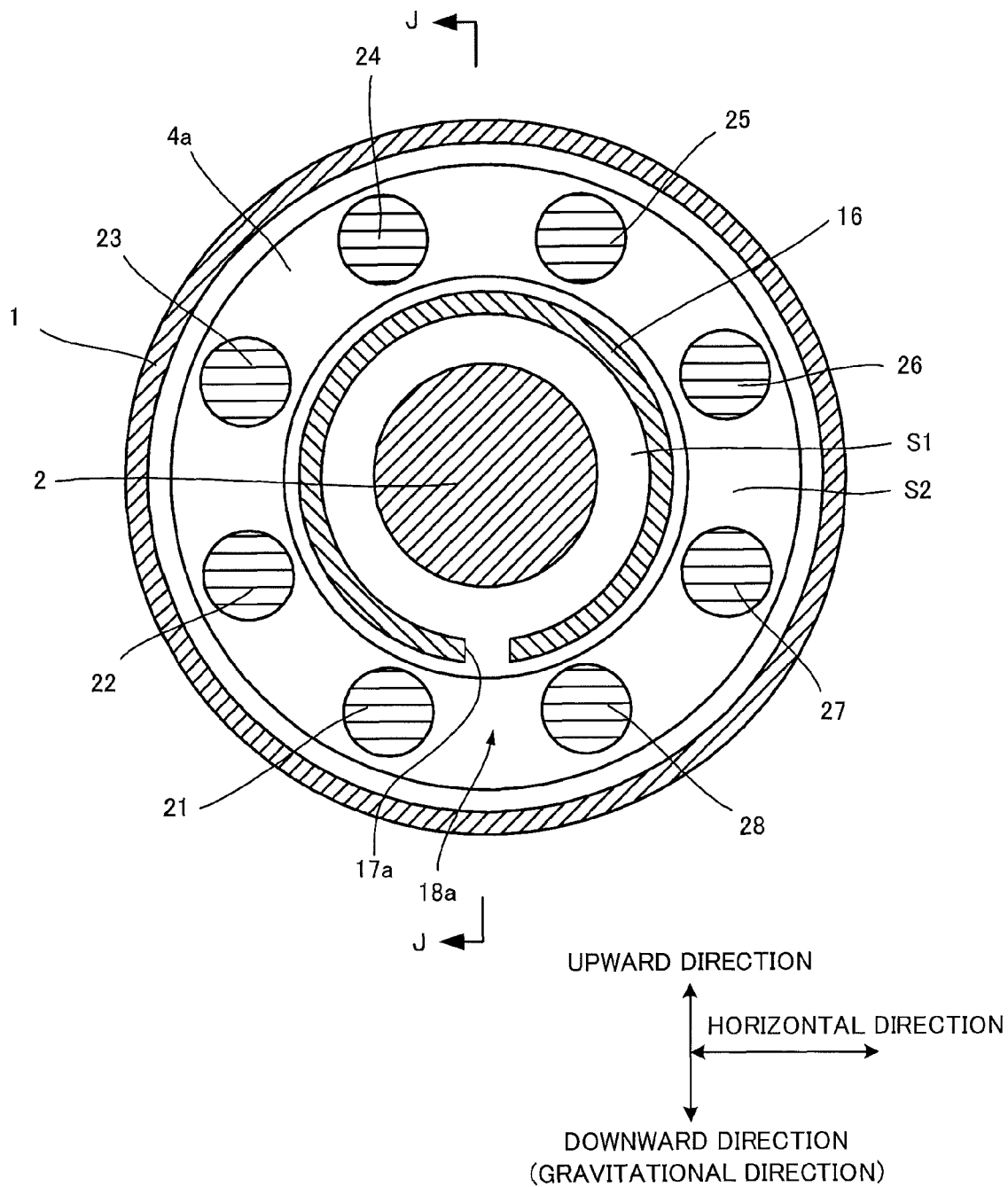
FIG. 16 shows a transverse cross sectional view taken along a line I-I of FIG. 15.

FIG. 15 shows a lengthwise cross section of a gas-insulated switchgear apparatus 104 according to Embodiment 4 of the present invention. FIG. 16 shows a transverse cross section taken along a line I-I of FIG. 15. FIG. 15 corresponds to the cross section taken along a line J-J in FIG. 16.

The gas-insulated switchgear apparatus 103 also has a foreign matter removing structure. In Embodiment 4, as shown in FIG. 15, between cores 4a, 4b, and 4c of a current transformer 4 are provided inter-core spacers 15a and 15b. As shown in FIG. 16, the inter-core spacer 15a is constituted by a plurality of members 21 to 28 that are circumferentially positioned with a gap provided therebetween. The gap 18a between the members 21 and 28 of the inter-core spacer 15a serves as the hole (opening) 14a of Embodiment 3. Like the inter-core spacer 15a, the inter-core spacer 15b is constituted by a plurality of members, with a gap 18b which serves as the hole 14b of Embodiment 3. Gaps between the members 21 to 28 may be the same with each other or different from each other.

An electric field shield 16 having a tubular (cylindrical) shape is disposed between the cores 4a, 4b, and 4c and the center conductor 2 to surround the center conductor 2, for the purpose of relaxing concentration of an electric field which might occur at corners of the current transformer 4 or due to unevenness of the surface of the current transformer 4. The current transformer 4 is fixed at the outer side of the electric field shield 16 by a fixing member 30. The electric field shield 16 is fixed to the metallic vessel 1 via the supporting member 31. The electric field shield 16 has openings 17a and 17b formed at a lowest portion thereof that oppose to the gaps 18a and 18b of the inter-core spacers 15a and 15b, respectively, for letting a foreign matter fall to be removed. The electric field shield 16 is set at the ground potential. In the other respects, the foreign matter removing structure is the same as Embodiment 1.

The cores 4a, 4b, and 4c are components that constitute the current transformer 4, which is a part of a tubular part. The inter-core spacers 15a and 15b are spacing members that keep the cores 4a, 4b, and 4c at fixed intervals. The current transformer 4, the inter-core spacers 15a and 15b, and the electric field shield 16 constitute a tubular part that surrounds the center conductor 2 and outputs a signal that represents an electric physical quantity.

Like in Embodiment 1, a foreign matter that has entered the space S1 between the electric field shield 16 and the center conductor 2 repetitively goes up and down by the effects of a levitation force originating from electrostatic induction or electrostatic polarization caused by an electric field applied there and a gravitational force, and eventually reaches the opening 17a or 17b and falls downward therethrough. The opening 17a or 17b and gap 18a in the inter-core spacer 15a or the gap 18b in the inter-core spacer 15b positioned below the opening 17a or 17b constitute a recessed structure, and allows the foreign matter to fall downward to the bottom of the metallic vessel 1. The bottom of the metallic vessel 1, to where the foreign matter has fallen, is in the space S2 which is under a low electric field, because it is positioned between the electric field shield 16 and the metallic vessel 1 which are at the ground potential. Accordingly, around the bottom there is no electrostatic force that is enough to make the foreign matter having fallen down go upward from there, leaving the foreign matter trapped in this position to be rendered harmless.

Figure 17:
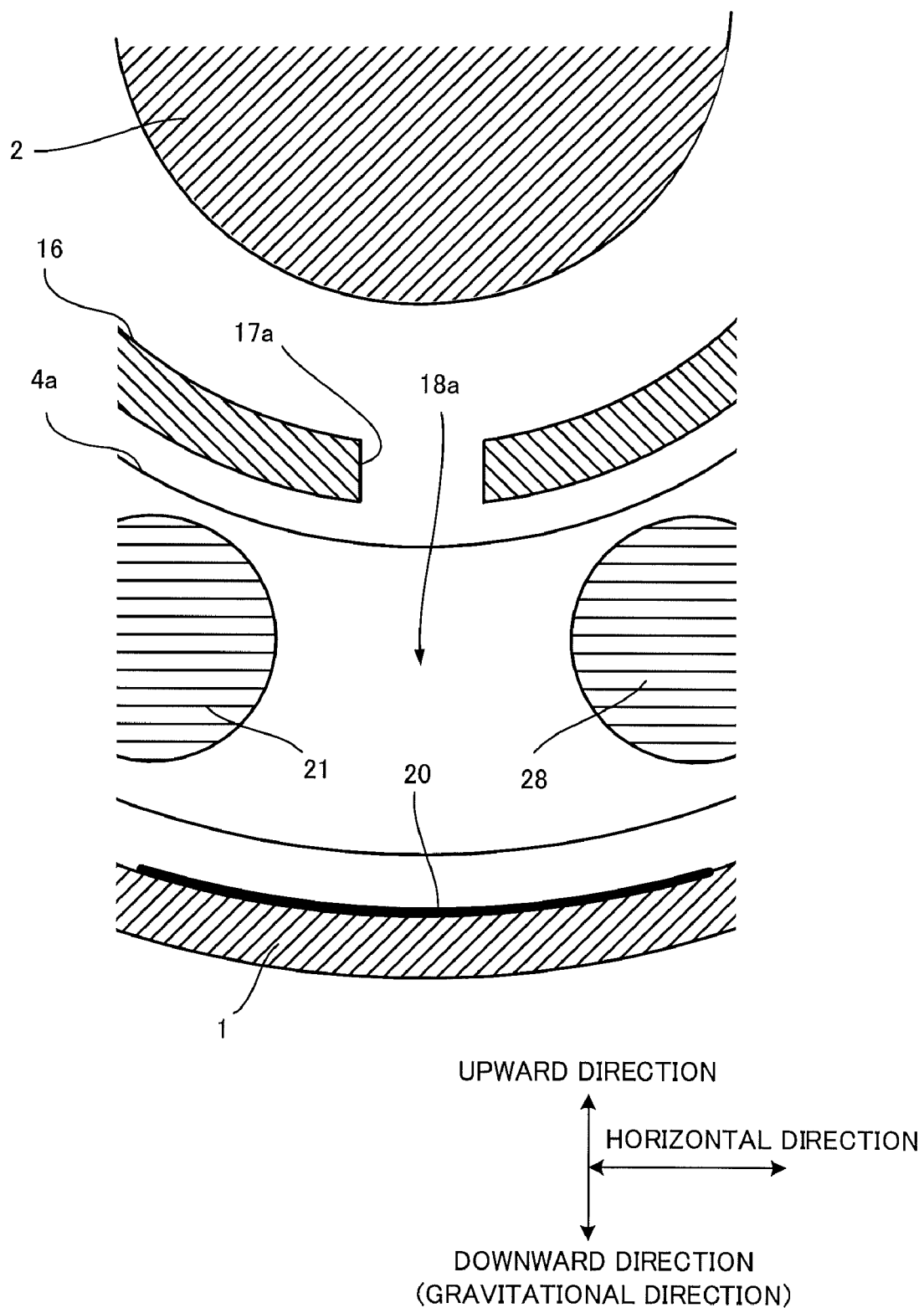
FIG. 17 is an enlarged cross sectional view of another applicable structure for the foreign matter removing structure shown in FIG. 16.

As shown in FIG. 17, an adhesive layer 20 may be provided on the portions of the metallic vessel 1 that face the center conductor 2 through the opening 17a or 17b. The adhesive layer 20 provided on the inner surface of the metallic vessel 1 which is the bottom of the recess portion, enables the foreign matter having fallen there to be more securely trapped. Further, the openings 17a and 17b may be integrally formed into a single opening. The adhesive layer 20 may be formed by sticking a sheet made of a gelatinous material, sticking a double-face adhesive tape, coating an adhesive coating material, or like manners.

As described above, the gas-insulated switchgear apparatus 104 according to Embodiment 4 removes a foreign matter that has entered between the center conductor 2 and the electric field shield 16 by letting the foreign matter fall through the opening 17a or 17b into a low electric field region inside the metallic vessel 1. The gas-insulated switchgear apparatus 104 can realize high insulation reliability, because it can quickly remove the foreign matter without requiring the foreign matter to travel a long distance until it reaches an end portion of the current transformer 4. Further, the gaps 18a and 18b formed in the inter-core spacers 15a and 15b can make a recess shape with the openings 17a and 17b deeper as the bottom of the recess shape corresponds to the inner surface of the metallic vessel 1, realizing a high foreign matter trapping performance. Embodiment 4 matches or excels Embodiment 1 in the effect of reducing environmental impacts at each stage of the life cycle of the gas-insulated switchgear.

The foregoing embodiments have shown different structures of opening and/or holes that are formed in a surface of a tubular part surrounding the center conductor 2, which surface is to be located in a lower portion of the tubular part and faces the center conductor 2. Such an opening can be modified in shape and still achieve the same effect, as long as such a modified shape allows a foreign matter, which has entered between the center conductor 2 and its surrounding tubular part, to be dislocated from the inner side of the tubular part to a region that is under a lower electric field than the inner side of the tubular part is. For example, such an opening or an opening portion may have a recess shape that is of a blind hole. As long as the bottom of the recess shape is under a sufficiently lower electric field than the upper end of the opening is, a foreign matter trapped there will not return toward the center portion 2.

The structure of the gas-insulated switchgear may be modified in any other arbitrary respects. The foregoing embodiments have explained a single phase of the gas-insulated switchgear. However, the gas-insulated switchgear may be a single-phase type or a three-phase type. The insulating/arc-extinguishing gas filled in the metallic vessel 1 may be $SF_6$ gas or an alternative gas having an insulating property and an arc-extinguishing property such as carbon dioxide, nitrogen, or a mixed gas of them.

The shape and mounting position of the center conductor 2 may be arbitrarily modified. The internal structure of the metallic vessel 1 may also be arbitrarily modified. The present invention can be applied to any structure that allows forming an opening, which is, when the structure is in its installation posture in which the center axis of a tubular part surrounding the center axis 2 is substantially horizontal, located in a lower portion of the tubular part and is on the side of the center conductor 2. The switchgear to be connected to the center conductor 2 may be of an arbitrary construction.

Any material and structure of the fixing member 30 and the supporting (base) member 31 can be used. For example, in the above described embodiments, the supporting member 31 is provided on one end portion in the axial direction of the tubular part (the current transformer 4, the electric field shield 5, and so on) to support the tubular part. The present invention is not limited to this. The tubular part may be supported at both axial ends thereof by any desired member(s). The electric field shield 5 and the supporting member 31 may be formed as different parts. The openings for removing the foreign matter may be formed in the supporting member 31 as well as the tubular part.

Any components such as the current transformer 4 and electric field shield 5 and so on which constitute the tubular part need not fully surround the center conductor 2 in the circumference direction thereof, but they may partially surround the center conductor 2 in the circumference direction thereof.

INDUSTRIAL APPLICABILITY

The present invention can be adopted to a gas-insulated switchgear apparatus having a tubular part that is disposed to surround a center conductor.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Applications No. 2008-307155 filed on Dec. 2, 2008 and No. 2009-252490 filed on Nov. 2, 2009 including specification, claims, drawings and summary. The disclosure of the above Japanese Patent Applications is incorporated herein by reference in its entirety.

What is claimed is:

1. A gas-insulated switchgear apparatus, comprising:
a center conductor through which an electric current flows;
a tubular part that is disposed to surround the center conductor;
a supporting member which is provided on at least one end portion of the tubular part and supports the tubular part; and
a vessel in which the center conductor, the tubular part and the supporting member are housed, and that is filled with an insulating gas,
wherein the tubular part has at least one opening formed in a surface, which faces the center conductor, of the tubular part,
wherein the at least one opening is formed so as to extend in a direction parallel to a center axis of the tubular part, or a plurality of openings including the at least one opening are formed in a direction parallel to a center axis of the tubular part.

2. The gas-insulated switchgear apparatus according to claim 1, further comprising an adhesive layer at a position that faces the center conductor through the at least one opening.

3. The gas-insulated switchgear apparatus according to claim 2, wherein a width of the adhesive layer in a circumferential direction thereof is larger than a width of the at least one opening formed in the tubular part in a circumferential direction thereof and/or a length of the adhesive layer in an axial direction thereof is larger than a length of the at least one opening in an axial direction thereof.

4. The gas-insulated switchgear apparatus according to claim 3, wherein the layer having adherence comprises a sheet made of a gelatinous material, a double-face adhesive tape, or an adhesive coating material.

5. A gas-insulated switchgear apparatus, comprising:
a center conductor through which an electric current flows;
a tubular part that is disposed to surround the center conductor;
a supporting member which is provided on at least one end portion of the tubular part and supports the tubular part; and
a vessel in which the center conductor, the tubular part and the supporting member are housed, and that is filled with an insulating gas,
wherein the tubular part has at least one opening formed in a surface, which faces the center conductor, of the tubular part,
wherein the at least one opening extends from one end portion to the other end portion in axial direction of the tubular part.

6. A gas-insulated switchgear apparatus, comprising:
a center conductor through which an electric current flows;
a tubular part that is disposed to surround the center conductor;
a supporting member which is provided on at least one end portion of the tubular part and supports the tubular part; and
a vessel in which the center conductor, the tubular part and the supporting member are housed, and that is filled with an insulating gas,
wherein the tubular part has at least one opening formed in a surface, which faces the center conductor, of the tubular part,
wherein the tubular part comprises at least one sensor, and an electric field shield provided between the center conductor and the sensor; and
the at least one opening is formed in the electric field shield.

7. The gas-insulated switchgear apparatus according to claim 6, wherein the at least one sensor is arranged so as to surround the electric field shield; and
a width in a circumferential direction of the at least one opening is smaller than a distance between a surface, which faces the center conductor, of the electric field shield and a surface, which faces the center conductor, of the at least one sensor.

8. The gas-insulated switchgear apparatus according to claim 6, wherein the at least one sensor, which is comprised in the tubular part, comprises a transformer that surrounds the center conductor.

9. The gas-insulated switchgear apparatus according to claim 6, further comprising an adhesive layer at a position that faces the center conductor through the at least one opening.

10. The gas-insulated switchgear apparatus according to claim 9, wherein a width of the adhesive layer in a circumferential direction thereof is larger than a width of the at least one opening formed in the tubular part in a circumferential direction thereof and/or a length of the adhesive layer in an axial direction thereof is larger than a length of the at least one opening in an axial direction thereof.

11. The gas-insulated switchgear apparatus according to claim 10, wherein the layer having adherence comprises a sheet made of a gelatinous material, a double-face adhesive tape, or an adhesive coating material.

12. A gas-insulated switchgear apparatus, comprising:
a center conductor through which an electric current flows;
a tubular part that is disposed to surround the center conductor;
a supporting member which is provided on at least one end portion of the tubular part and supports the tubular part; and
a vessel in which the center conductor, the tubular part and the supporting member are housed, and that is filled with an insulating gas,
wherein the tubular part has at least one opening formed in a surface, which faces the center conductor, of the tubular part,
wherein the tubular part comprises:
at least one sensor arranged so as to surround the center conductor; and
an electric field shield provided between the center conductor and the at least one sensor and arranged so as to surround the center conductor, and
the at least one opening is formed in the electric field shield.

13. A gas-insulated switchgear apparatus, comprising:
a center conductor through which an electric current flows;
a tubular part that is disposed to surround the center conductor;
a supporting member which is provided on at least one end portion of the tubular part and supports the tubular part; and
a vessel in which the center conductor, the tubular part and the supporting member are housed, and that is filled with an insulating gas,
wherein the tubular part has at least one opening formed in a surface, which faces the center conductor, of the tubular part,
wherein an electric field in a first space between the center conductor and the tubular part is stronger than an electric field in a second space under the at least one opening while a current flows through the center conductor, foreign matter being able to fall down into the second space through the at least one opening by gravitation.

14. The gas-insulated switchgear apparatus according to claim 13, further comprising an adhesive layer at a position that faces the center conductor through the at least one opening.

15. The gas-insulated switchgear apparatus according to claim 14, wherein a width of the adhesive layer in a circumferential direction thereof is larger than a width of the at least one opening formed in the tubular part in a circumferential direction thereof and/or a length of the adhesive layer in an axial direction thereof is larger than a length of the at least one opening in an axial direction thereof.

16. The gas-insulated switchgear apparatus according to claim 15, wherein the layer having adherence comprises a sheet made of a gelatinous material, a double-face adhesive tape, or an adhesive coating material.

17. A gas-insulated switchgear apparatus, comprising:
a center conductor through which an electric current flows;
a tubular part that is disposed to surround the center conductor;
a supporting member which is provided on at least one end portion of the tubular part and supports the tubular part; and
a vessel in which the center conductor, the tubular part and the supporting member are housed, and that is filled with an insulating gas,
wherein the tubular part has at least one opening formed in a surface, which faces the center conductor, of the tubular part,
wherein the tubular part comprises at least two components that each surrounds the center conductor, and a spacing member, which is provided between the at least two components to keep the components at a fixed interval, and
in a vicinity of the at least one opening, a distance between surfaces of the spacing member which faces the center conductor and a center axis of the center conductor is greater than a distance between surfaces of the at least two components that face the center conductor and the center axis of the center conductor.

18. A gas-insulated switchgear apparatus, comprising:
a center conductor through which an electric current flows;
a tubular part that is disposed to surround the center conductor;
a supporting member which is provided on at least one end portion of the tubular part and supports the tubular part; and
a vessel in which the center conductor, the tubular part and the supporting member are housed, and that is filled with an insulating gas,
wherein the tubular part has at least one opening formed in a surface, which faces the center conductor, of the tubular part,
wherein the tubular part comprises at least two components that each surrounds the center conductor, and a spacing member which is provided between the at least two components to keep the components at a fixed interval, and
the spacing member has a hole at a portion facing the at least one opening formed in the tubular part.

19. The gas-insulated switchgear according to claim 18, wherein the spacing member comprises at least two members that are arranged in a circumferential direction of the tubular part, and
the at least two members of the spacing member are disposed to have a gap there between that serves as the hole.

20. The gas-insulated switchgear apparatus according to claim 18, wherein a size, in a circumferential direction, of the hole of the spacing member is larger than a size, in a circumferential direction, of the at least one opening of the tubular part.

* * * * *